Patented Sept. 3, 1929.

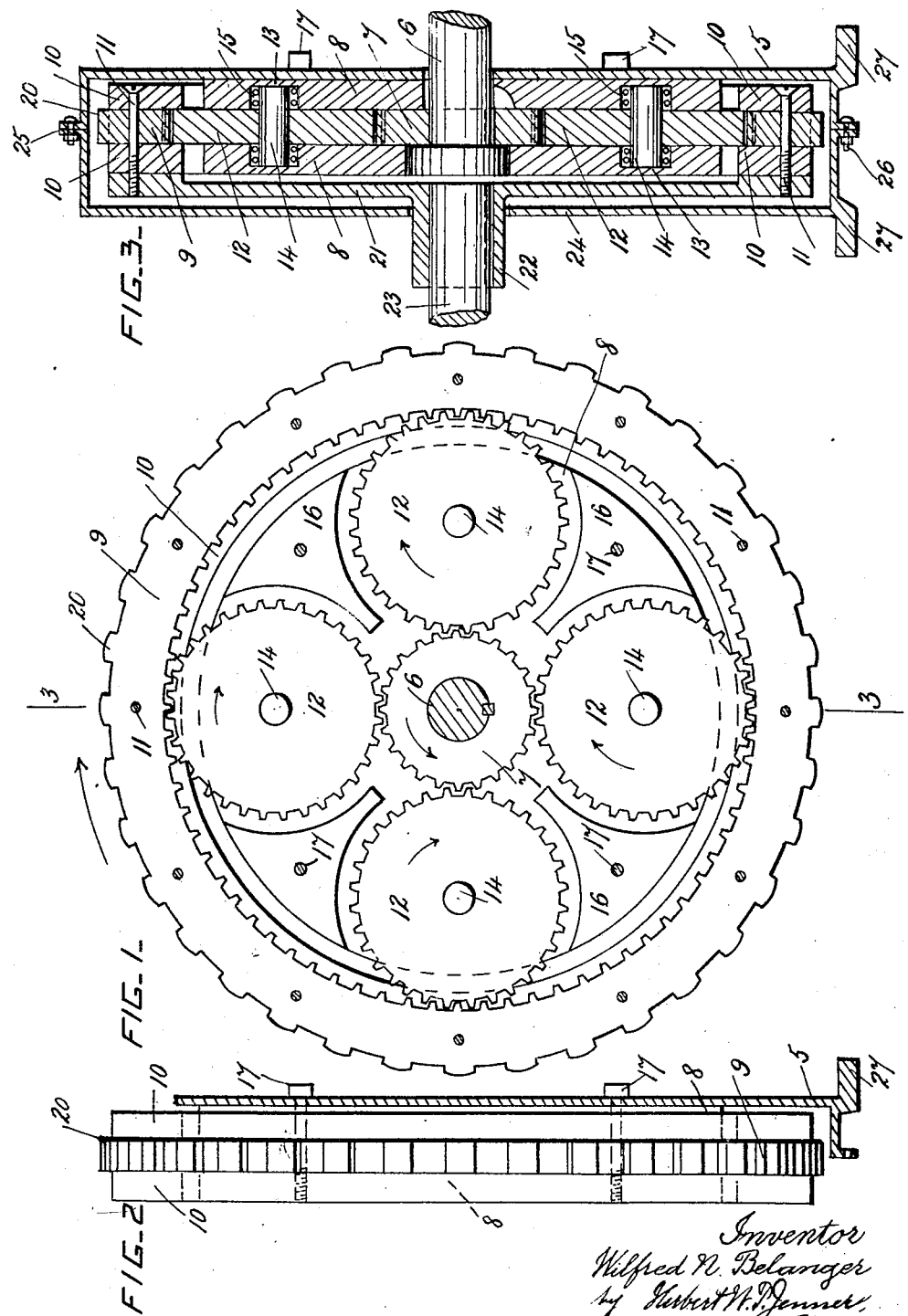

1,726,879

UNITED STATES PATENT OFFICE.

WILFRED NAPOLEON BELANGER, OF LAWRENCE, MASSACHUSETTS.

DRIVING MECHANISM.

Application filed February 8, 1928. Serial No. 252,823.

This invention relates to mechanism used for driving machinery from a power shaft which is driven at a relatively high speed; and it consists of certain toothed wheels constructed and arranged as hereinafter fully described and claimed and adapted to drive a machine at a slower speed than the power shaft.

In the drawings, Fig. 1 is a side view of a driving mechanism constructed according to this invention, with the casing and one of the side plates and rings removed. Fig. 2 is an edge view of the sprocket wheel and the two side rings and plates of the mechanism. Fig. 3 is a cross-section through the complete driving mechanism as used to connect two concentric shafts, taken through the drive wheels on the line 3—3 in Fig. 1.

The driving shaft 6 is mounted in any suitable bearings, and has a toothed driving pinion 7 secured on it. Two side plates 8 are provided, and are mounted concentric with the shaft 6, and are arranged one on each side of the pinion, and are secured to a stationary support 5. A toothed ring 9 having internal teeth is arranged in line with and concentric with the pinion, and has side rings 10 secured to it by means of screws 11. A series of toothed idle wheels 12 is provided, and four wheels 12 are preferred. These wheels 12 are mounted on pins 14 which are journaled in ball bearings 15 formed in pockets 13 in the side plates. The ends of bottoms of these pockets are closed so as to retain the pins in place. The teeth of the idle wheels mesh into the teeth of the pinion and the toothed ring, so that when the driving shaft 6 is rotated the toothed ring is rotated in the opposite direction and at a slower speed. Distance pieces 16 are bolted between the side plates in the spaces between the idle wheels, so that the side plates are rigidly secured together. The side plates and the distance pieces are bolted together and to the stationary support by bolts 17. The side plates 8 are readily disconnected by removing the bolts 17, so that access can be had to the ball bearings. The distance pieces hold the side plates apart so that they do not bear hard against the sides of the wheels and pinion. This arrangement of parts and the use of the ball bearings enables the wheels to rotate with great freedom, and their bearings do not require to be lubricated.

The toothed ring is provided on its periphery with sprocket wheel teeth 20, when the driving mechanism is used to communicate motion to a drive chain, and the side rings 10 form a bed for the drive chain, but these teeth are dispensed with when the driving mechanism is used to operate a leather belt.

This driving mechanism is also provided with a plate 21 which is bolted to one side of the toothed ring by screws 11, and is provided with a hub 22. This hub is secured on a shaft 23 arranged axially in line with the shaft 6, and journaled in any suitable bearings. The driving mechanism can be used for driving both a shaft and a drive chain, or for either of them separately, or for a belt. Any suitable casing 24 may be provided. This casing incloses the driving mechanism, and is preferably formed in two halves provided with flanges 25 and bolts 26 for securing them together. The casing has also base flanges 27 for securing it to any suitable support. The casing has any suitable openings for the passage of the drive chain or belt, but if desired the casing may be dispensed with altogether. One side of the casing may be used as the stationary support 5 for the side plates, or a separate support for them can be provided if preferred.

What I claim is:

1. In a driving mechanism, a driving shaft, a toothed pinion secured thereon, a stationary support, side plates arranged one on each side of the pinion and provided with distance pieces and secured to the stationary support, an internal toothed ring encircling the toothed pinion, side rings secured to the toothed ring and forming with it an external driving device, toothed idle wheels journaled in the side plates and meshing into the pinion and toothed ring, the said idle wheels being arranged circumferentially between the said distance pieces, a driven shaft journaled in line with the driving shaft, and a plate secured at its periphery to the said toothed ring and side rings and provided with means for securing it on the driven shaft.

2. A driving mechanism as set forth in claim 1, and provided with an inclosing casing formed in sections, one side portion of one section forming the said stationary support to which the said side plates and distance pieces are secured.

3. A driving mechanism comprising two shafts arranged in line with each other, a pinion secured on one of the shafts, a stationary support, two side plates arranged one on each side of the pinion and provided with distance pieces and secured to the said support, an internal toothed ring encircling the said pinion, idle wheels journaled in the side plates and operatively connecting the said pinion and toothed ring, said idle wheels being arranged circumferentially between the said distance pieces, and a plate secured on the other shaft and having its periphery secured to the said toothed ring.

In testimony whereof I have affixed my signature.

WILFRED NAPOLEON BELANGER.